United States Patent [19]

von Raven

[11] Patent Number: 5,846,382

[45] Date of Patent: Dec. 8, 1998

[54] PROCESS FOR ENHANCING THE WHITENESS, BRIGHTNESS AND CHROMATICITY OF FILLERS AND PIGMENTS

[75] Inventor: Axel von Raven, Seeshaupt, Germany

[73] Assignee: Jorax GmbH, Seeshaupt, Germany

[21] Appl. No.: 770,059

[22] Filed: Dec. 19, 1996

Related U.S. Application Data

[63] Continuation of Ser. No. 435,773, May 5, 1995, abandoned, which is a continuation of Ser. No. 119,461, Sep. 9, 1993.

[30] Foreign Application Priority Data

Sep. 14, 1992 [DE] Germany .......................... 24 30 656.6

[51] Int. Cl.⁶ .............................. D21H 11/00; C08J 5/34; C08K 5/34
[52] U.S. Cl. .......................... 162/162; 162/135; 427/157; 427/158; 427/411; 427/419.1; 428/688; 428/689; 524/88
[58] Field of Search .................................. 427/157, 158, 427/411, 419.8; 428/211, 688, 689, 537.5; 524/88; 162/135, 136, 162, 164.1

[56] References Cited

U.S. PATENT DOCUMENTS

| | | | |
|---|---|---|---|
| 2,124,256 | 7/1938 | Mayer | 8/139 |
| 3,479,349 | 11/1969 | Pelliseen et al. | 260/240 |
| 3,669,896 | 6/1972 | Prininger et al. | 252/313 |
| 3,927,967 | 12/1975 | Speakman | 8/103 |
| 3,960,589 | 6/1976 | Morrison et al. | 106/296 |
| 3,984,399 | 10/1976 | Weber et al. | 260/240 |
| 4,033,718 | 7/1977 | Molcombe et al. | 8/103 |
| 4,062,647 | 12/1977 | Storm et al. | 252/135 |
| 4,146,725 | 3/1979 | Meyer et al. | 548/327 |
| 4,166,718 | 9/1979 | Reinert et al. | 8/111 |
| 4,256,598 | 3/1981 | Sakkab | 252/99 |
| 4,311,605 | 1/1982 | Eckhardt et al. | 252/102 |
| 4,548,610 | 10/1985 | Preiswerk et al. | 8/101 |
| 4,661,164 | 4/1987 | Severinghaus, Jr. | 106/288 |
| 4,665,165 | 5/1987 | Wald | 570/124 |
| 4,990,280 | 2/1991 | Thorengaard et al. | 252/95 |
| 5,104,722 | 4/1992 | Kojima et al. | 428/218 |
| 5,139,760 | 8/1992 | Ogawa et al. | 423/328 |
| 5,376,288 | 12/1994 | Falholt et al. | 252/95 |

FOREIGN PATENT DOCUMENTS

| | | |
|---|---|---|
| 32159 | 8/1908 | Australia . |
| 1150908 | 10/1983 | Canada . |
| 0153278 | 8/1985 | European Pat. Off. . |
| 2025467 | 9/1970 | France . |
| 2203857 | 5/1974 | France . |
| 2151727 | 4/1972 | Germany . |
| 2715721 | 10/1977 | Germany . |
| 2943652 | 4/1981 | Germany . |
| 3400161 | 7/1984 | Germany . |
| 3542719 | 6/1986 | Germany . |
| 3626777 | 2/1988 | Germany . |
| 3436015 | 3/1990 | Germany . |
| 4006277 | 9/1990 | Germany . |
| 60130660 | 7/1985 | Japan ........................................ 524/88 |
| 548484 | 4/1974 | Switzerland . |
| 647799 | 2/1985 | Switzerland . |
| 1232719 | 5/1986 | U.S.S.R. . |
| 1134767 | 11/1968 | United Kingdom . |
| 1372036 | 10/1974 | United Kingdom . |
| 1394910 | 5/1975 | United Kingdom . |
| 1537512 | 12/1978 | United Kingdom . |
| 2068428 | 8/1981 | United Kingdom . |
| 2082195 | 3/1982 | United Kingdom . |
| 2117783 | 10/1983 | United Kingdom ...................... 524/88 |
| 2148344 | 5/1986 | United Kingdom . |
| 2168984 | 7/1986 | United Kingdom . |

OTHER PUBLICATIONS

Derw. Abst. 88–043643/07 AF DE 3,626,777.
Derw. Abst. 81–32789D/19 AF DE 2,943,652.
Derw. Abst. 87/346688/49.
Derw. Abst. 83/721153/30.
Derw. Abst. 34579T–AEF.
Derw. Abst. 74695V/43.
Derw. Abstd. 71232U–AF.
Derw. Abst. 31934V/17.
F. Müller, Optische Aufheller, Allgemeine papier—Reundschau, Apr. 13, 1970 pp. 1120–1122 Pat. Absts. Japan vol. 4, No. 113, (1980).
Derw. Abst. 26755U/16.
Derw. Abst. 09476X/06.
Derw. Abst. 16254E/09.
Derw. 76844A/43.
Textil—Rundschau, Jul. 1961, pp. 390–398 "Tabelle der Textulhiusmettel".
Derw. Abst. 84–251591/41.
Derw. Absts 92–016730 (1992).
Derw. Abst. SV–A–1,353,789.
Derw. Abst. 84–183714/30 of DE 3,400,161.
Derw. Abst. 88–173472 [25].
Hackh's Dictionary, 4th Ed. (1969) pp. 519.
Encyclopedia of Industrial Chemistry, vol. A18 pp. 154–176, (1991).
Kirk—Othmer Encyclopedia of Chemical Technology, 4th Edition, vol. 11, pp. 227–241 (1994).
Borsenberger & Weiss, *Organic Photoreceptors for Imaging Systems*, 105–106, (1993).
Webster's II New Riverside Dictionary, 884 (1984).
Webster's Third New International Dictionary (unabridged), 1702 (1986).

*Primary Examiner*—Bernard P. Codd
*Attorney, Agent, or Firm*—Sprung Kramer Schaefer & Briscoe

[57] ABSTRACT

The invention relates to the addition of sulfonated zinc, manganese, or aluminum phthalocyanines to inorganic fillers and pigments for enhancing their whiteness, brightness and chromaticity, as well as to the fillers and pigments and mixtures thereof so obtained, and to the use thereof in e.g. paper manufacture.

3 Claims, No Drawings

PROCESS FOR ENHANCING THE WHITENESS, BRIGHTNESS AND CHROMATICITY OF FILLERS AND PIGMENTS

This application is a continuation of application Ser. No. 08/435,773, filed May 5, 1995 now abandoned, which is a continuation of Ser. No. 08/119,461, filed Sep. 9, 1993.

The present invention relates to the addition of photosensitising compounds to inorganic fillers and pigments for enhancing their whiteness, brightness and chromaticity, as well as to the fillers and pigments and mixtures thereof so obtained.

Fillers and pigments are used in the preparation of a host of products. Typical fields of use are the manufacture of paints, ceramics, rubber and plastics. The bulk of white pigments, however, are used for coating paper. The pigments form the actual "body" of the coating. As—aside from individual exceptions—they account for 80% to 95% of the total dry coating weight, they substantially govern the quality and, especially, the whiteness of the coating as well as its efficiency.

The naturally occurring fillers and pigments such as kaolin, natural calcium carbonates (e.g. chalk and marble), talcum and the like, often do not meet the stringent whiteness requirements. The addition of strongly colouring substances such as coloured minerals or humus can have a highly adverse affect on whiteness. For this reason, numerous processes for enhancing whiteness and chromaticity have been developed.

Quite generally, a distinction may be made here between physical and chemical methods. By physical methods are meant those that selectively remove a colouring impurity by mechanical means. Such means are in particular flotation, selective sedimentation and magnetic separation methods. The chemical processes are normally based on "bleaching". In such processes, organic colouring constituents are usually bleached oxidatively, and inorganic colouring constituents are usually bleached reductively. The object is normally to convert trivalent iron into divalent iron and to remove this latter in dissolved form as completely as possible. The divalent iron would otherwise gradually impair the whiteness again by reoxidation in air.

A great number of bleaching methods are disclosed in the patent literature. The most frequently used reducing agents are sodium and zinc dithionite. The divalent iron which has been dissolved must then be sequestered so that it remains in solution and the non-removable portion must be protected from reoxidation. Normally phosphates, fluorides or chelating agents such as EDTA are used for this purpose. A further method consists in removing the divalent iron ion with ion exchangers.

Another means of enhancing whiteness consists in adding dyes to the fillers and pigments. The drawbacks here are that, in contrast to the whiteness, the brightness decreases and, when slurrying the pigments or filler, the dyes can separate therefrom.

Surprisingly, it has been found that the whiteness, brightness and chromaticity of fillers, pigments or mixtures thereof can be enhanced by the addition of photoactivators.

In this process, the inorganic as well as the organic constituents are "bleached".

To achieve this object, the preferred procedure is to mix the photoactivator or a mixture of photoactivators, in the absence or presence of further auxiliary components such as surfactants, typically dodecyl sulfate, chelating agents such as phosphonates, and fillers such as zeolites, as well as the fillers, pigments or mixtures thereof, thoroughly with water. It is preferred to mix the ingredients thoroughly in the temperature range from 10° to 90° C. and, most preferably, from 20° to 70° C., for more than half an hour, preferably for 1 to 3 hours, to ensure good mixing with atmospheric oxygen. The pH of the suspension during mixing is preferably 7.0 to 11. Mixing can conveniently be effected by stirring, circulation pumping or blowing in air.

The amount of photoactivator is normally from 0.0001 to 0.1% and, preferably, from 0.001 to 0.01%, based on the amount of filler or pigment employed.

The suspension of the catalytically bleached fillers, pigments or mixtures thereof so obtained can afterwards be dried at 60°–90° C. However, direct further processing of the still moist fillers and pigments is also possible.

The advantage resides in the catalytic course of the process, the photoactivator (catalyst) making a removal of the decolourised compounds unnecessary through its retention in the fillers and pigments.

Photoactivators which may suitably be used for the process of this invention are all dyes that have a photodynamic effect, typically eosin, Rose Bengal, fluorescein, chlorophyll, porphyrin compounds, methylene blue or mixtures thereof. Preferred dyes are the water-soluble phthalocyanines, for example the phthalocyanine metal complexes of aluminium, zinc, manganese, magnesium, calcium, iron, sodium or potassium. These compounds may be used singly or in admixture.

Preferred photoactivators are compounds of formula (1)

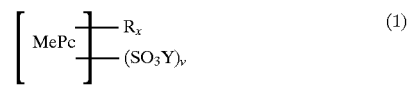

and mixtures thereof, wherein

MePC is the zinc, manganese or aluminium phthalocyanine ring system,

Y is hydrogen, an alkali metal or ammonium, preferably hydrogen, potassium or sodium, v is any number from 1 to 4, preferably a number from 2 to 4, R is fluorine, chlorine, bromine or iodine, preferably chlorine or bromine, x is any number from 0 to 8, preferably (if MePC is the zinc or aluminium phthalocyanine ring system) any number from 0.8 to 2.

The photoactivators and their preparation are commonly known in the art and some are used for bleaching textiles (GB-A-1 372 036, US-A-3 927 967, DE-A-2 613 936, DE-A-2 812 278). Surprisingly, in contradistinction to the conditions described in these references, when bleaching fillers, pigments or mixtures thereof, irradiation with light during the treatment or at least in the moist state, and the addition of builder substances as well as detergents, are not necessary.

The fillers or pigments eligible for use in the practice of this invention are typically inorganic pigments such as aluminium silicates, magnesium silicates, aluminium/magnesium mixed silicates, calcium carbonates, calcium sulfates, titanium dioxides and mixtures thereof. It is preferred to use white fillers and white pigments such as titanium dioxide, kaolin, bentonite, chalk, limestone, marble, calcite, aragonite, mica, gypsum, talcum or mixtures thereof.

The process is, however, also applicable to coloured pigments or fillers which are stable under these conditions to improve the purity of their colour.

The invention further relates to the fillers, pigments and mixtures thereof treated by the novel process, and to the use thereof in the manufacture of paints, ceramics. rubber, plastics and, in particular, paper.

The fillers, pigments and mixtures thereof so obtained find utility especially in the paints, ceramics, rubber, plastics and, in particular, paper industry. For this utility they can be blended with further components such as fluorescent whitening agents, binders such as latex, acrylic acid or styrene polymers or their copolymers; fillers and other auxiliaries such as polyethgylene glycol or glycol ethers.

Particularly useful synergistic effects are also obtained by combining photoactivators with fluorescent whitening agents such as diphenylbistyryls.

The invention is illustrated by the following non-limitative Examples in which percentages, unless otherwise indicated, are by weight.

EXAMPLE 1

400 g of dry filler of Table 1 are dispersed in 500 g of mains water that contains 0.15 % of polyacrylate, and the pH is adjusted to 9.5 with aqueous sodium hydroxide. To the dispersion are then added 0.05 % of sodium dodecyl sulfate and, after thorough mixing, 40 mg of a 0.1 % solution containing a phthalocyanine of formula (2)

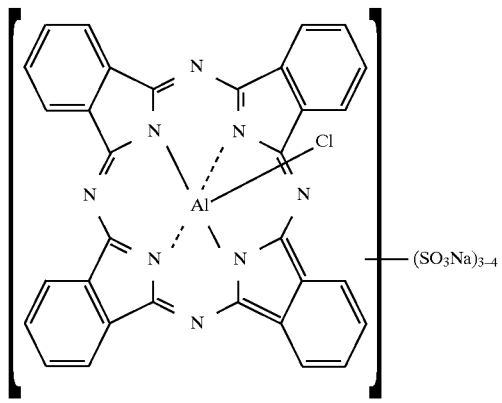

(2)

The resultant suspension is stirred for 2 hours at room temperature with an agitator at average to high speed.

The samples are dried to constant weight with circulating air in a drying oven at 70° C., then ground, and the whiteness is measured in accordance with DIN 53 245, Parts 1+2.

This is done by preparing a measuring pellet on a glass plate under a pressure of 120 kPa for 10 sec. The reflectance factors are measured on the surface, which was in contact with the glass plate during compression, with an apparatus that meets the criteria of DIN 53 145 Part 1.

TABLE 1

| Filler/ | Whiteness | |
|---|---|---|
| pigment | without | with photoactivator |
| stock clay | 85.2 | 88.1 |
| coating clay | 84.6 | 86.0 |
| mica | 77.8 | 78.5 |
| talcum | 78.1 | 83.7 |
| flue gas gypsum | 77.6 | 83.4 |
| $CaCO_3$ slurry | 81.8 | 84.6 |

The results in Table 1 show that the addition of a photoactivator effects a marked increase in whiteness.

EXAMPLE 2

The mixtures listed in Table 2 are prepared as described in Example 1 and the whiteness is measured.

TABLE 2

| | Experiment No. | | | | | |
|---|---|---|---|---|---|---|
| Conditions | 1 | 2 | 3 | 4 | 5 | 6 |
| water [g] | 400 | 400 | 400 | 400 | 400 | 400 |
| stock clay [g] | 400 | 400 | 0 | 0 | 0 | 0 |
| coating clay [g] | 0 | 0 | 400 | 400 | 400 | 400 |
| dodecyl sulfate [%] | 0.05 | 0.05 | 0.05 | 0.05 | 0.05 | 0.05 |
| pH | 9.6 | 9.7 | 9.5 | 9.6 | 9.5 | 9.5 |
| compound (2) [ml 0.1% soln.] | 0 | 40 | 0 | 40 | 40. | 40 |
| drying in sunlight | − | + | − | + | − | − |
| drying in a drying oven | + | − | + | − | + | − |
| stirring and drying in the dark | − | − | − | − | − | + |
| whiteness | 79.1 | 80 | 81.2 | 85.7 | 86 | 85.6 |

The results in Table 2 show clearly that irradiation with light is not necessary to increase whiteness.

EXAMPLE 3

The mixtures listed in Table 3 are prepared as described in Example 1 and the whiteness and chromaticity values are measured.

TABLE 3

| | Experiment No. | | | | | | | | untreated |
|---|---|---|---|---|---|---|---|---|---|
| Conditions | 1 | 2 | 3 | 4 | 5 | 6 | 7 | 8 | dry kaolin |
| water [g] | 300 | 300 | 300 | 300 | 300 | 300 | 300 | 300 | |
| kaolin [g] | 300 | 300 | 300 | 300 | 300 | 300 | 300 | 300 | |
| dodecyl sulfate [%] | 0.05 | 0.05 | 0.05 | 0 | 0.05 | 0 | 0.05 | 0.05 | |
| polyacrylate [%] | 0.15 | 0.15 | 0.15 | 0 | 0.15 | 0 | 0.15 | 0.15 | |
| polyphosphate [%] | 0 | 0 | 0 | 0.15 | 0 | 0 | 0 | 0 | |

TABLE 3-continued

| Conditions | Experiment No. | | | | | | | | untreated dry kaolin |
|---|---|---|---|---|---|---|---|---|---|
| | 1 | 2 | 3 | 4 | 5 | 6 | 7 | 8 | |
| NaOH [ml 20% soln.] | 0.7 | 0.7 | 0.7 | 0.7 | 0.7 | 0.7 | 0.7 | 0.7 | |
| pH | 9.9 | 9.5 | 9.5 | 9.5 | 9.5 | 9.5 | 9.5 | 9.5 | |
| H$_2$O$_2$ [% 30% soln.] | 0 | 0 | 0 | 0 | 0.5 | 0 | 0 | 0 | |
| compound (2) [ml 0.1% soln.] | 30 | 10 | 20 | 20 | 20 | 20 | 30 | 20 | |
| drying by stirring at [°C.] | 25 | 25 | 25 | 25 | 25 | 25 | 70 | 70 | |
| whiteness | 86.1 | 87.3 | 87.1 | 87.3 | 87 | 86.8 | 86.2 | 87.1 | 85.5 |
| luminosity [%] | 90 | 91.2 | 91.1 | 91.1 | 91.3 | 90.7 | 91 | 91 | 89.9 |
| chromaticity value K x | 0.3186 | 0.319 | 0.3189 | 0.3186 | 0.3197 | 0.3187 | 0.3137 | 0.3188 | 0.3199 |
| chromaticity vaiue K y | 0.337 | 0.3368 | 0.337 | 0.3368 | 0.3372 | 0.337 | 0.334 | 0.337 | 0.3374 |

The results in Table 3 show that the presence of builders and detergents is not necessary for increasing whiteness.

EXAMPLE 4

The mixtures listed in Table 4 are prepared as described in Example 1 and the whiteness and chromaticity values are measured.

TABLE 4

| Conditions | Experiment No | | | |
|---|---|---|---|---|
| | 1 | 2 | 3 | 4 |
| H$_2$O [g] | 400 | 400 | 400 | 400 |
| stock clay [g] | 400 | 400 | 0 | 0 |
| coating clay [g] | 0 | 0 | 400 | 400 |
| dodecyl sulfate [%] | 0 | 0.05 | 0 | 0.05 |
| polyacrylate [%] | 0 | 0.3 | 0 | 0.3 |
| pH | 9.5 | 9.5 | 10.2 | 10.2 |
| compound (2) [ml 0.1% soln.] | 0 | 40 | 0 | 40 |
| whiteness | 79.6 | 88.1 | 81.2 | 86 |
| luminosity y [%] | 85.7 | 91.6 | 85.6 | 89.5 |
| chromaticity value K x | 0.3227 | 0.318 | 0.32 | 0.3181 |
| chromaticity value K y | 0.3406 | 0.3365 | 0.381 | 0.3367 |

The results in Table 4 show that the chromaticity has scarcely changed despite a marked increase in whiteness.

EXAMPLE 5

The mixtures listed in Table 5 are prepared as in described in Example 1 using calcium carbonate as pigment. The whiteness and chromaticity values are measured as described in Example 1.

TABLE 5

| Conditions | Experiment No. | |
|---|---|---|
| | without photo-activator | Photo-activator (2) |
| whiteness | 81.8 | 84.6 |
| luminosity y [%] | 86.7 | 86.7 |
| chromaticity value K x | 0.3182 | 0.368 |
| chromaticity value K y | 0.335 | 0.3341 |

EXAMPLE 6

The mixtures listed in Table 6 are prepared as described in Example 1 and the whiteness and chromaticity values are measured.

TABLE 6

| Conditions | Experiment No. | | untreated dry sample |
|---|---|---|---|
| | 1 | 2 | |
| H$_2$O [g] | 125 | 125 | |
| talcum [g] | 300 | 300 | |
| dodecyl sulfate [%] | 0.05 | 0.05 | |
| polyacrylate [%] | 0.15 | 0.15 | |
| pH | 9.5 | 9.5 | |
| compound (2) [ml 0.1% soln.] | 20 | 20 | |
| stirring temperature [C.] | 25 | 70 | |
| whiteness | 83.3 | 83.2 | 78 |
| luminosity y [%] | 85 | 84.4 | 80 |
| chromaticity value K x | 0.3137 | 0.3138 | 0.3167 |
| chromaticity value K y | 0.334 | 0.334 | 0.347 |

The results in Table 6 show the minor influence of the stirring temperature on whiteness.

EXAMPLE 7

A coating composition is prepared from the following components:

100 parts of dry Clay DB® (used as 70% slurry);

0.5 part of polyvinyl alcohol (Mowiol 4–98®);

18 parts of a 50% dispersion of a styrene(butylrubber latex (Dow Latex 955®); and 4 ppm of the compound of formula (3) or (4):

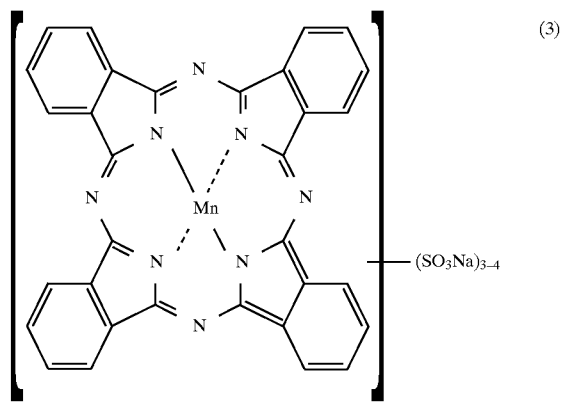

$$\left[\begin{array}{c}\text{[phthalocyanine-Zn-Cl structure]}\end{array}\right]\text{—(SO}_3\text{Na)}_{3-4} \quad (4)$$

Dispersion is carried out at pH=10 (NaOH) by efficient stirring.

The resultant dispersion is coated on to base paper of high wood content (50% groundwood). Coating is effected with a laboratory coater with blade (Dow coater), so that the add-on is 12.5 g/m². After drying with hot air of 95°–200° C. to equilibrium moisture content, the whiteness is measured in accordance with DIN 53 245, Parts 1+2.

The whiteness is also measured after subsequent exposure for 5, 10, 20 or 40 hours under neon daylight lamps.

TABLE 7

| Neon light | TAPPI Whiteness ($R_{457}$) | | |
|---|---|---|---|
| | No addition | Compound (3) | Compound (4) |
| no exposure | 56.11 | 57.65 | 57.78 |
| 5 h | 55.88 | 56.96 | 57.05 |
| 10 h | 56.43 | 57.43 | 57.44 |
| 20 h | 56.26 | 57.07 | 57.55 |
| 40 h | 55.98 | 57.12 | 57.37 |

The results in Table 7 show that the addition of very minor amounts of the compounds of formulae (3) or (4) to the coating composition increases the TAPPI whiteness after drying on ligneous coating base papers. This advantage is retained even after subsequent exposure.

EXAMPLE 8

A coating composition is prepared from the following components by mixing with efficient stirring:

100 parts of kaolin (70% aqueous slurry)
0.02 part of antifoam
0.8 part of lubricant
4.5 parts of polyacrylate binder
0.3 part of thickener
0.2 part of alkali (NaOH)
3 ppm of compound of formula (2)
0.15–0.3% of the fluorescent whitening agent of formula $$\text{[stilbene-biphenyl structure with SO}_3\text{H groups]} \quad (5)$$

A) Four experiments are carried out with the resultant coating composition (applied as 15% aqueous slurry) on a Helicoater (Helicoater 2000®), adding different amounts of the fluorescent whitener of formula (5).

TABLE 8

| | Experiment No. | | | |
|---|---|---|---|---|
| Conditions | 1 | 2 | 3 | 4 |
| % compound (5) | 0.15 | 0.15 | 0.30 | 0.30 |
| compound (2) | — | 3 | — | 3 |
| whiteness | | | | |
| 1) without UV | 81.9 | 82.4 | 81.1 | 82.2 |
| 2) with UV | 85.51 | 86.27 | 85.51 | 86.52 |
| brightness | 85.23 | 85.77 | 85.05 | 85.73 |

It follows from the results that the combined use of fluorescent whiteners of formula (5) and the compound of formula (2) effects a marked increase in whiteness—without and with UV—compared with the sole use of whiteners. Simultaneously a slight shift in chromaticity from yellow to bluish is made possible.

B) Two experiments are carried out on a Dixon coater with the coating composition which contains only 0.2% of the fluorescent whitener of formula (5).

TABLE 9

| | Experiment No. | |
|---|---|---|
| Conditions | 1 | 2 |
| % compound (5) | 0.2 | 0.2 |
| compound (2) | — | 3 |
| whiteness (W) | | |
| 1) W incandescent light | 73.3 | 75.8 |
| 2) W xenon light | 77.6 | 78.2 |

It follows from the results in Table 9 that in these experiments a marked increase in whiteness is effected by the combination of compounds of formulae (2) and (5) compared with the experiment using the compound of formula (5) alone.

What is claimed is:

1. A method for coating paper which comprises applying to said paper an aqueous dispersion consisting essentially of water and a) an inorganic filler or pigment which is selected from the group consisting of aluminum silicates, magnesium silicates, aluminum/magnesium mixed silicates, calcium carbonates, calcium sulfates, titanium dioxides and mixtures thereof, b) a photoactivator which is of the formula (1)

$$\left(\text{MePc}\begin{array}{c}\text{—}R_x\\\text{—(SO}_3Y)_v\end{array}\right) \quad (1)$$

wherein
MePC is the zinc, manganese or aluminum phthalocyanine ring system,
Y is hydrogen, an alkali metal or ammonium,
v is any number from 1 to 4,
R is fluorine, chlorine, bromine or iodine, and
x is any number from 0 to 8 and c) a binder and drying.

2. A coated paper which has been coated in accordance with the method of claim 1.

3. A coated paper wherein the coating comprises
a) an inorganic filler or pigment which is selected from the group consisting of aluminum silicates, magnesium silicates, aluminum/magnesium mixed silicates, calcium carbonates, calcium sulfates, titanium dioxides and mixtures thereof,
b) a photoactivator which is of the formula (1)

wherein

MePC is the zinc, manganese or aluminum phthalocyanine ring system,

Y is hydrogen, an alkali metal or ammonium, v is any number from 1 to 4,

R is fluorine, chlorine, bromine or iodine, and x is any number from 0 to 8 and c) a binder.

* * * * *

UNITED STATES PATENT AND TRADEMARK OFFICE
CERTIFICATE OF CORRECTION

PATENT NO : 5,846,382
DATED : December 8, 1998
INVENTOR(S): Axel von RAVEN

It is certified that error appears in the above-identified patent and that said Letters Patent is hereby corrected as shown below:

| | |
|---|---|
| Title Page, [30] | Delete "24 30 656.6" and substitute --42 30 656.6-- |
| Title Page, [56] | U.S. Patent Documents, line 2, delete "Pellissen" and substitute --Alliseen-- |
| Title Page, [56] | U.S. Patent Documents, line 3, delete "Prininger" and substitute --Preininger--. |
| Title Page, [56] | U.S. Patent Documents, line 15, delete "570" and substitute --540-- |

UNITED STATES PATENT AND TRADEMARK OFFICE
CERTIFICATE OF CORRECTION

PATENT NO. : 5,846,382
DATED : December 8, 1998
INVENTOR(S) : Axel von RAVEN

It is certified that error appears in the above-identified patent and that said Letters Patent is hereby corrected as shown below:

Title Page, [56]    Foreign Patent Documents, insert --1079717, March 1984, Soviet Union--

Title Page, [56]    Foreign Patent Documents, line 1, delete "Australia" and insert --Austria--.

Signed and Sealed this

Twenty-seventh Day of June, 2000

Attest:

Q. TODD DICKINSON

*Attesting Officer*    Director of Patents and Trademarks